Aug. 26, 1930.   E. F. NORELIUS   1,774,451
POWER CART
Filed April 14, 1926   3 Sheets-Sheet 1
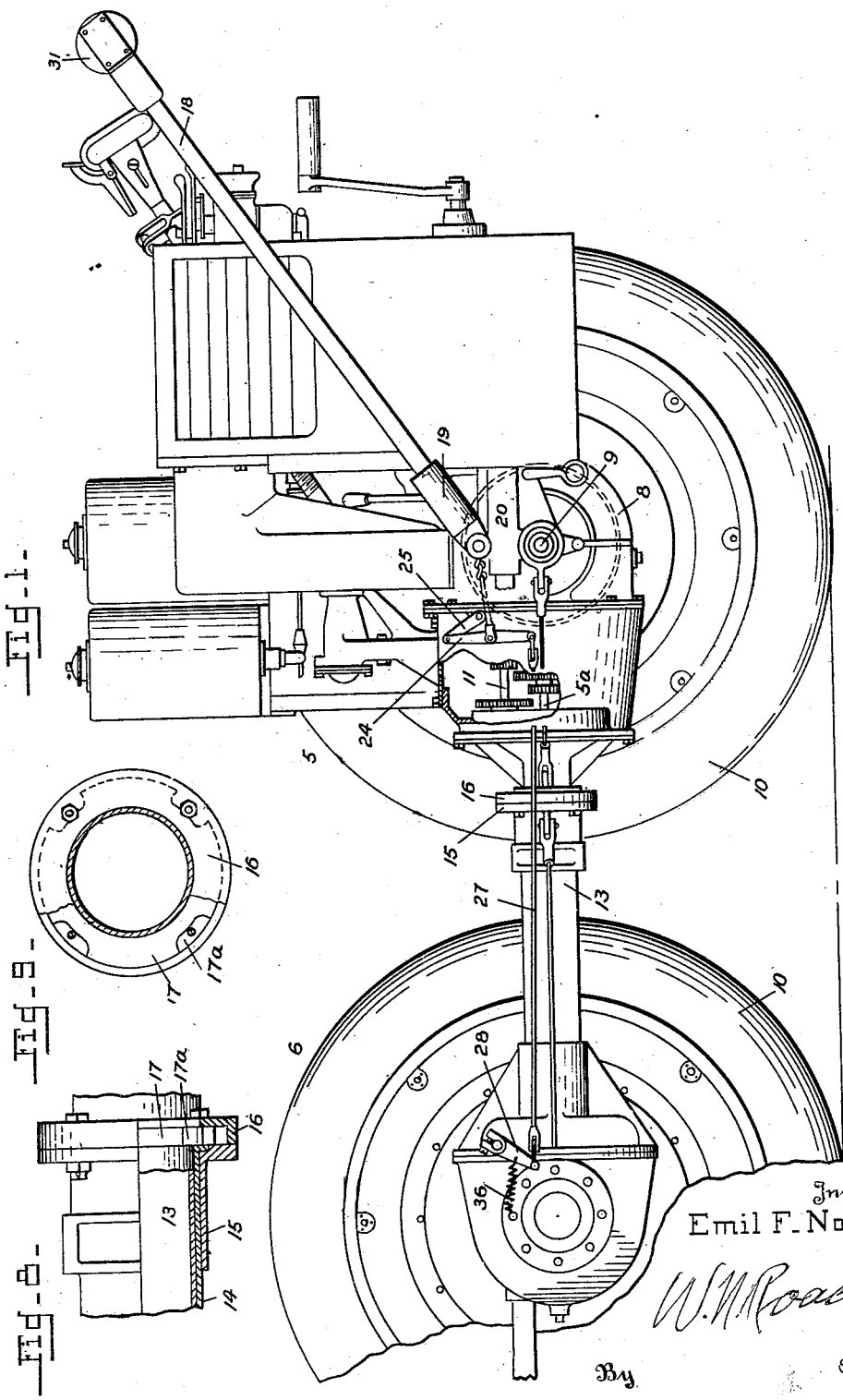
Inventor
Emil F. Norelius
By W. M. Roach
Attorney

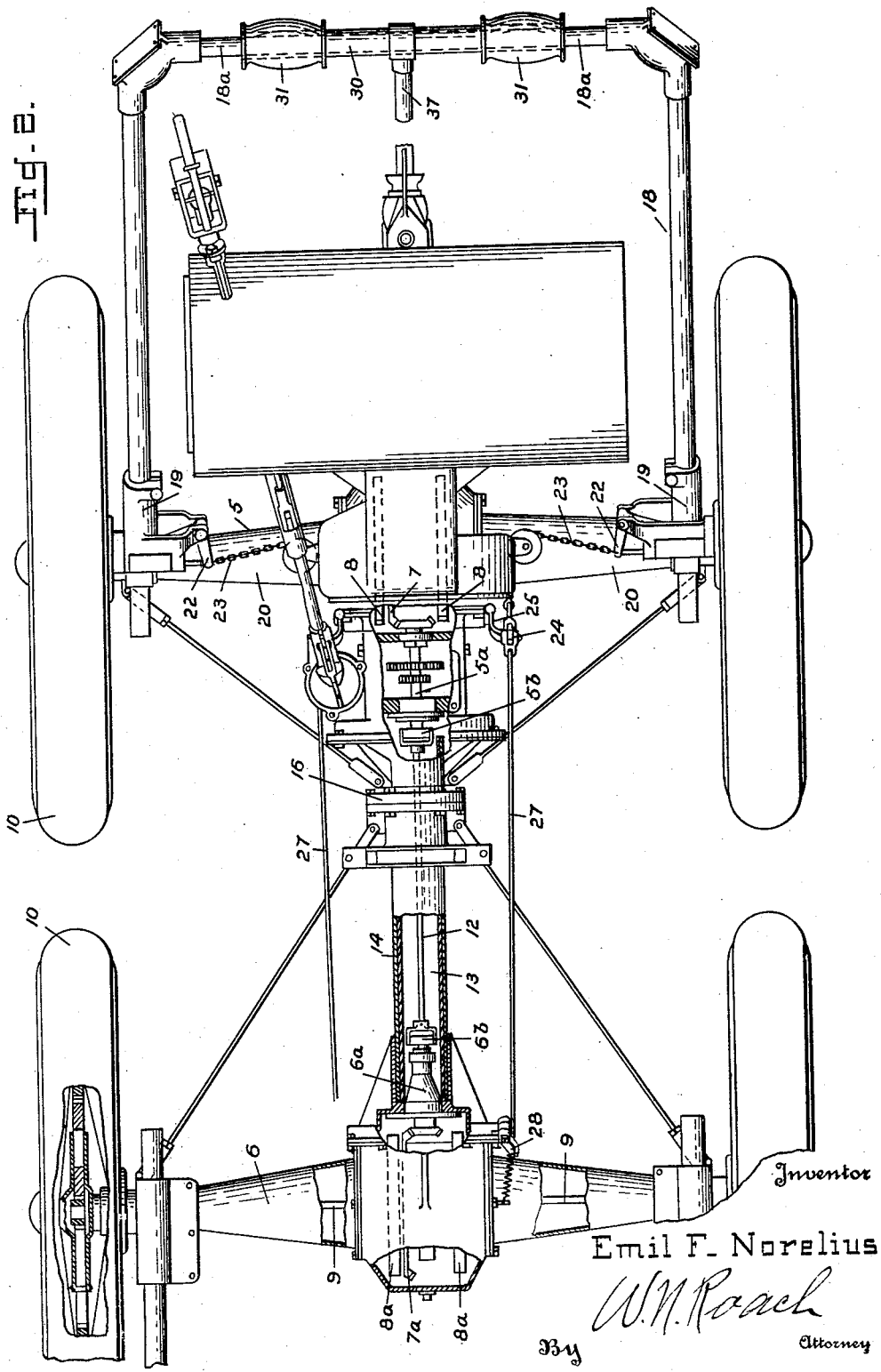

Aug. 26, 1930.  E. F. NORELIUS  1,774,451
POWER CART
Filed April 14, 1926   3 Sheets-Sheet 3
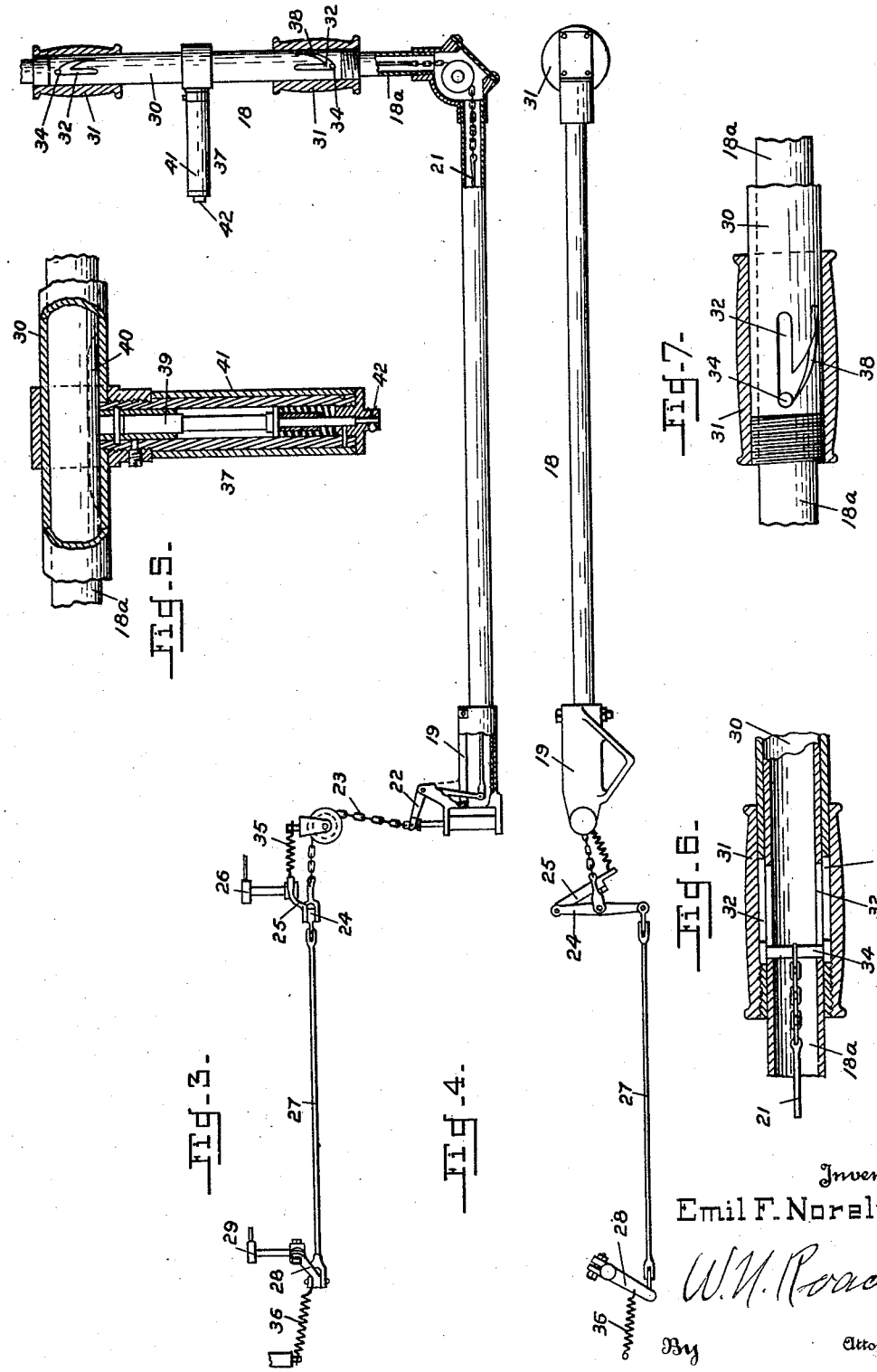
Inventor
Emil F. Norelius
W. H. Roach
By   Attorney Patented Aug. 26, 1930

1,774,451

UNITED STATES PATENT OFFICE

EMIL F. NORELIUS, OF DAVENPORT, IOWA

POWER CART

Application filed April 14, 1926. Serial No. 102,082.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to a power cart and in particular it has reference to that type of four wheel drive vehicle in which the front and rear axle units are so articulated as to afford independent rotational movement in traveling over rough ground.

In vehicles of this character which have been previously proposed the method of steering consists in turning the axle units out of parallelism with each other usually by a co-related movement. This provision imposes the necessity of introducing universal couplings in the propeller shaft, an expedient which has proven very unsatisfactory.

Accordingly, I propose to rigidly connect the front and rear axle units without interfering with their independent rotational movement and steering will be performed by partially or completely retarding rotation of the pivot wheels. In executing turns on a long radius there is sufficient flexibility in the tires to make the turn while on a short radius the tires must slip. Inasmuch as carts of this type are not designed for use on roads but for cross country travel such slipping action will not be detrimental to the tires.

Retarding of the wheels is effected by a novel steering apparatus so arranged that its application will slightly assist in the turning movement. Provision is also made whereby all wheels may be braked simultaneously.

To these and other ends, my invention consists in the construction, arrangement, and combination of elements as described hereinafter and pointed out in the claims forming a part of this specification.

A practical embodiment of the invention is illustrated in the accompanying drawings, wherein:

Fig. 1 is a view in side elevation, parts removed and parts in section of my improved power cart;

Fig. 2 is a plan view of the cart, parts thereof being shown in section;

Fig. 3 is a plan view of the steering apparatus of one side of the cart;

Fig. 4 is an elevational view of Fig. 3;

Figs. 5, 6 and 7 are detail sectional views of units of the handle bar assembly; and Figs. 8 and 9 are detail sectional views through the torque tube coupling.

Referring to the drawings by numerals of reference:

The power cart consists of two principal units, a rear axle unit 5 and a front axle unit 6, each housing a pinion shaft $5^a$ and $6^a$ geared to a more or less conventional controlled differential 7 and $7^a$, that for the front unit being shown in Fig. 2, and each differential including a pair of brake drums 8—8 and $8^a$—$8^a$. From the differential the drive is taken along standard lines through axle shafts 9—9 to the final drive unit contained within the wheels 10.

The power plant is carried by the rear axle unit and transmits its power through a suitable multiple speed drive 11 to the shaft $5^a$. A drive shaft 12 is connected at each end to the pinion shafts by being splined to members $5^b$ and $6^b$ on the respective inner ends of said shafts and thus provides for communicating power to the front axle unit.

The drive shaft is disposed within a pair of concentric torque tubes 13 and 14, respectively, rigidly attached to the rear and front axle units, the tube 13 having a free fit within the tube 14 to enable the units to have independent rotational movement in traveling over rough ground. The tubes are secured against endway movement in any suitable manner, specifically (Figs. 8 and 9) by means of a fixed collar 15 on the rear end of the outer tube 14 to which is bolted a split ring 16 which bears against a flange 17 fixed to the rear end of the inner tube 13. The securing bolts are disposed in slots $17^a$ in the flange so as to permit swiveling movement of the tubes.

From the foregoing it will be seen that the cart is rigid in so far as steering is concerned. I propose to accomplish steering by retarding the pivot wheels which will thus be caused to slip along the ground.

The steering apparatus by means of which the bands are applied to the brake drums 8 of the rear unit and the brake drums $8^a$ of the front unit is associated with a handle bar 18 fixed to the rear axle unit.

The handle bar comprises a U-shaped tubular frame extending in rear of the cart and having its free ends secured in brackets 19 fixed on the axle housing 20 adjacent the rear wheels. Within the handle bar is a cable 21, each end of which is connected to a bell crank lever 22, pivoted in the bracket 19. The bell crank levers are each in turn connected to a cable 23, one being provided for each side of the cart and this cable 23 operates through an equalizer bar 24 to actuate the link 25 and the brake lever 26 of the rear brake band and the links 27—28 and the brake lever 29 of front brake band. These elements are identical on each side of the cart.

Slidably mounted on the cross piece 18$^a$ of the handle bar is a sleeve 30, on the ends of which are fixed grips 31. The sleeve 30 is provided adjacent each end with opposed longitudinally disposed slots 32 normally registering with slots 33 in the cross piece and disposed in these slots is a pin 34 fixed to the cable 21. As best seen in Fig. 3, the two pins 34 are normally positioned in the opposite ends of the slots so that when the tube 30 is pushed to the right, the left hand pin only is actuated to apply the brake bands on the left side of the cart, and when the tube is pushed to the left a corresponding action occurs. By this arrangement the force required to apply the brakes is exerted at the rear of the cart and in a direction opposite to the direction of turn and thereby assists in the steering of the vehicle. As soon as the pressure on the tube is released, the springs 35 and 36 acting on the links 25 and 28 will release the brakes and restore the cable 21 and tube 30 to initial position.

In order that the right and left hand brakes may be applied simultaneously in bringing the cart to rest, a handle 37 is provided for imparting rotational movement to the tube 30. To this end the tube is formed with oblique cam slots 38—38 which are thus brought to act on the pins 34 to draw them towards each other. This consequently draws up the right and left hand portions of the cable and applies all brakes simultaneously. The handle is provided with a plunger 39 normally held in a groove 40 in the cross piece 18$^a$ to prevent operation of the cam slots 38 and rotation of the tube. The plunger is disengaged by pulling down on the shell 41, which strikes the base 42 of the plunger.

Certain circumstances such as the distribution of the weight of the cart and the amount of draw bar pull may render it desirable to apply the brakes with unequal force and provision therefore may be readily incorporated in the control unit.

I claim:

1. A cart embodying front and rear axle units provided with wheels fixed as regards steering, a power plant in one of the units, concentric torque tubes having swiveling movement with respect to each other, each rigidly secured to one of the axle units, a drive shaft in each unit, a propeller shaft within the torque tubes and geared to the drive shafts and means for steering the cart by retarding the inside wheels.

2. A control system for power driven carts embodying a U-shaped handle bar attached to the rear of the cart, a cable in each side of said handle bar, a pair of front and rear brake elements, the right hand brakes connected in series to one cable and the left hand brakes similarly connected to the other cable, a grip member on the crosspiece of the handle bar, an operative connection between the grip member and both cables whereby when the grip member is moved right or left, the opposite brakes are applied and means whereby when the grip member is rotated, all of the brakes are applied simultaneously.

3. A control system for power driven carts embodying a handle bar attached to the rear of the cart, a cable in each side of said handle bar, a pair of front and rear brake elements, the right hand brakes connected in series to one cable and the left hand brakes similarly connected to the other cable, a grip member slidable on the handle bar and an operative connection between the grip member and both cables whereby when the grip member is moved right or left the opposite brakes are applied.

4. In a bi-lateral control system, a rigid tube formed with spaced longitudinally extending slots, a grip member slidable and rotatable on the tube and provided with spaced longitudinally extending slots corresponding to the slots in the tube and also provided with spaced oblique slots each continuous with the remote extremity of one of the longitudinally extending slots, said oblique slots being convergently disposed, and a control member within the tube extending through the slot in the tube and engageable in the slots of the grip member.

5. In a bi-lateral control system, a rigid supporting member, a control member slidably and rotatably mounted thereon, a controlled member at each end of the control member and operative connections between the control member and the controlled members whereby the direction of slidable movement of the control member selectively actuates the controlled members and rotatable movement of the control member simultaneously actuates the controlled members.

6. A control system for self-propelled vehicles which are steered by driving, embodying a handle bar, a cable in each side of the handle bar, a pair of front and rear brake elements, the right hand brakes connected in series to one cable and the left hand brakes similarly connected to the other cable, a grip member slidable and rotatable on the handle bar, and an operative connection between the grip member and both cables whereby when the grip member is moved right or left the opposite brakes are applied and when rotated all the brakes are applied simultaneously.

7. A control system for self-propelled vehicles which are steered by driving, embodying a pair of front wheel and rear wheel brake elements, a control member reciprocally and rotatably mounted on a rigid unit of the vehicle, and a flexible connection between each end of the control member and the front and rear brake elements on the corresponding side of the vehicle whereby reciprocation of the control member will selectively apply the brake elements on one side or the other of the vehicle and rotation of the control member will apply all the brakes simultaneously.

EMIL F. NORELIUS.